(12) United States Patent
Gillet

(10) Patent No.: US 7,946,842 B2
(45) Date of Patent: May 24, 2011

(54) TRANSFER CHAIN FOR A PREFORM HEATER INTENDED FOR A CONTAINER BLOW-MOLDING MACHINE

(75) Inventor: Denis Gillet, Octeville sur Mer (FR)

(73) Assignee: Sidel Participations, Octeville-sur-Mer (FR)

( * ) Notice: Subject to any disclaimer, the term of this patent is extended or adjusted under 35 U.S.C. 154(b) by 616 days.

(21) Appl. No.: 12/064,831

(22) PCT Filed: Aug. 22, 2006

(86) PCT No.: PCT/EP2006/065558
§ 371 (c)(1),
(2), (4) Date: Feb. 26, 2008

(87) PCT Pub. No.: WO2007/025911
PCT Pub. Date: Mar. 8, 2007

(65) Prior Publication Data
US 2008/0187616 A1    Aug. 7, 2008

(30) Foreign Application Priority Data
Aug. 29, 2005  (FR) ................................... 05 52591

(51) Int. Cl.
*B29C 49/68* (2006.01)
*B65G 17/20* (2006.01)

(52) U.S. Cl. .................. 425/526; 198/470.1; 425/534; 432/124

(58) Field of Classification Search .............. 425/526, 425/534; 432/124; 198/470.1
See application file for complete search history.

(56) References Cited

U.S. PATENT DOCUMENTS

| | | | | |
|---|---|---|---|---|
| 1,205,503 A * | 11/1916 | Barnhart et al. | ............... | 432/123 |
| 2,469,681 A * | 5/1949 | Coby | ............... | 65/227 |
| 3,740,868 A * | 6/1973 | Moore et al. | ............... | 34/105 |
| 3,840,999 A * | 10/1974 | Whelan | ............... | 34/105 |
| 3,850,573 A * | 11/1974 | Yoshikawa et al. | ............... | 432/124 |
| 3,860,104 A * | 1/1975 | Strauss | ............... | 198/459.3 |
| 3,940,242 A * | 2/1976 | Matsumura et al. | ............... | 432/124 |
| 3,947,243 A * | 3/1976 | Sokolow | ............... | 432/124 |
| 4,140,481 A * | 2/1979 | Oas | ............... | 432/124 |
| 4,432,720 A | 2/1984 | Wiatt et al. | | |
| 6,109,907 A | 8/2000 | Takada et al. | | |
| 6,514,448 B1 | 2/2003 | Vogel et al. | | |

FOREIGN PATENT DOCUMENTS

| | | |
|---|---|---|
| AU | 742520 B2 | 1/2002 |
| EP | 0 920 974 A2 | 6/1999 |
| WO | 03/018293 A1 | 6/2003 |

OTHER PUBLICATIONS

Nov. 22, 2006 International Search Report in corresponding PCT/EP2006/065558.

* cited by examiner

*Primary Examiner* — Robert B Davis
(74) *Attorney, Agent, or Firm* — Young & Thompson

(57) ABSTRACT

A transfer chain for a preform heater, the heater intended for a machine for blow-molding containers, each container being formed from a preform. The transfer chain is intended for a preform heater (31) of the kind in which a preform support element is mounted on an articulated chain with a member for rotating the preform during its travel in the heater. The member for rotating the preform includes a shaft (77) which is fastened to an element (75) of the articulated chain (60) and carries a pinion (62) compelled to roll along a rolling track (63, 65) fastened to a frame (79) when the articulated chain is driven by a motor unit.

16 Claims, 3 Drawing Sheets

PRIOR ART

TRANSFER CHAIN FOR A PREFORM HEATER INTENDED FOR A CONTAINER BLOW-MOLDING MACHINE

BACKGROUND OF THE INVENTION

The present invention relates to a transfer chain for a preform heater. Such a heater is intended for a machine for blow-molding containers, each container being formed from a preform.

DESCRIPTION OF THE PRIOR ART

In the prior art, a container blow-molding machine has already been described that receives, as input, a succession of thermoplastic preforms and which produces, as output, containers derived from the preforms. Such a blow-molding machine principally comprises a heater for heating the preforms that travel inside a succession of heating chambers, followed by a set of molds into each of which at least one heated, and therefore softened, preform is inserted. Next, on each mold there is a blow-molding element that deforms the preform, until the material of the softened preform is applied against the internal walls of the mold so as to form a container of specified shape. It is in this way that for example bottles of mineral water are produced at extremely high rates.

The prior art has already described a transfer chain which makes it possible, on a device for loading preforms at ambient temperature, to take a preform so as to place it on a preform support means and to drive it along a predetermined path inside the heater. The heater comprises a succession of heating chambers in which the temperature of the preform is progressively increased. However, to apply uniform heating over the entire mass of material of the preform, it is known that a preform support means is made to undergo a rotational movement about the axis of the preform so that, during the travel of the preform in the heater, all points on the preform receive on average the same amount of thermal energy. This is particularly the case when each heating chamber is equipped with a heating rail comprising several infrared lamps.

The prior art has already described devices which make it possible in addition to invert each preform before it enters the heater and/or after it leaves the heater. In particular, these preform-inverting devices allow the neck portion and a bottom portion to be correctly oriented either during the travel in the heater or during introduction of the heated preform into the mold that was described previously. For this purpose, the preform support means is associated with a chain of articulated components which makes it possible to apply, at least one point of travel on the transfer chain associated with the heater, a preform-inverting movement.

The prior art has already described a means for rotating the axis of the preform as the latter travels through the heater. Such a means for rotating the axis of the preform comprises a link chain which is fixedly mounted so that a toothed wheel fastened to a shaft coaxial with the axis of the preform, mounted on bearings fastened to the preform support means, engages, during moments when the preform has to rotate about its axis, in the links of the stationary chain. However, because of the tension that has to be applied to the chain in order to keep it stationary relative to the travel of the various toothed wheels associated with the set of preform support means, the links of the chain must have a sufficient size. It follows that the toothed wheel itself must have toothing of sufficient pitch. Now, this dimensional constraint goes counter to the need to have means for supporting successive preforms in the transfer chain that are as close together as possible, so as to increase the rate of production of formed containers. To solve this problem, it has already been proposed to have two link chains parallel to each other positioned at different heights, so that a given transfer means meshes via its toothed wheel with the lower link chain while the following transfer means meshes via its toothed wheel with the upper link chain.

SUMMARY OF THE INVENTION

The present invention relates to an improvement to this prior art in that it relates to a transfer chain for a preform heater of the kind in which a preform support means is mounted on an articulated chain with a means for rotating the preform as it travels in the heater. The invention is in particular characterized in that the means for rotating the preform comprises a shaft which is fastened to an element of the articulated chain and carries a pinion compelled to roll along a rolling track fastened to a frame when said articulated chain is driven by a motor means.

According to another aspect of the invention, the support, in the form of an approximately vertical panel, accommodates a support plate.

According to another aspect of the invention, the support plate supports a translation means for translating the successive preform support means.

According to another aspect of the invention, the upper portion of the support plate serves as a rolling rail for a wheel, which wheel may have a self-centering profile and is mounted on a shaft fastened to a body for an articulated chain.

According to another aspect of the invention, the body carries a shaft, the axis of which is coincident with the axis of symmetry of a preform gripped by a gripper, the shaft carrying, fixed so as to rotate, a pinion which is intended to be driven along a rolling track mounted on the support.

According to another aspect of the invention, the rolling track, presented to the pinion, is formed along the travel path that the preforms take in the heater, on a portion of the support plate fastened to the support.

According to another aspect of the invention, the rolling track is made up of a cogged belt which has been unwound and attached to a flat portion of the bottom of the rail-shaped support plate.

According to another aspect of the invention, the cog pitch of the cogged belt is adapted to the toothing modulus of the pinion, and the cog pitch and toothing modulus values are determined on the basis of the intended run speed on the transfer chain so as to give each of the preforms mounted on successive support means, such as the support means, a suitable rotation speed, the rotation speed being calculated so as to allow the mass of the preform to be uniformly heated.

According to another aspect of the invention, the stiffness of the rolling track is provided by screwing the ends of approximately straight sections of the cogged belt onto the corresponding portion of the support plate.

According to another aspect of the invention, the pinion is interposed between the body of the articulated chain and the actual body of the preform support means.

According to another aspect of the invention, the cogged belt has a height that simplifies the relative adjustment of the preform support means with respect to the other, stationary elements such as the articulated chain.

According to another aspect of the invention, the association of the rolling track and of the portion for attaching the rolling track to one and the same support plate is determined so as to dispense with adjusting the relative heights of the support cams of the articulated chain relative to the link chains on the one hand and relative to the heating chambers of the heater on the other.

According to another aspect of the invention, the transfer chain is positioned on several paths passing through the heating elements so that each pinion of the means for rotating the preform is in turn engaged on a rolling track and a frame associated with said heating elements (A1, A2, B1, B2).

Finally, the invention also relates to a machine for blow-molding containers based on preforms heated in a heater. The heater includes a preform transfer chain.

BRIEF DESCRIPTION OF THE DRAWINGS

Other advantages and features of the present invention will be more clearly understood with the aid of the description and the figures, in which.

DESCRIPTION OF THE PREFERRED EMBODIMENTS

Figure 1:
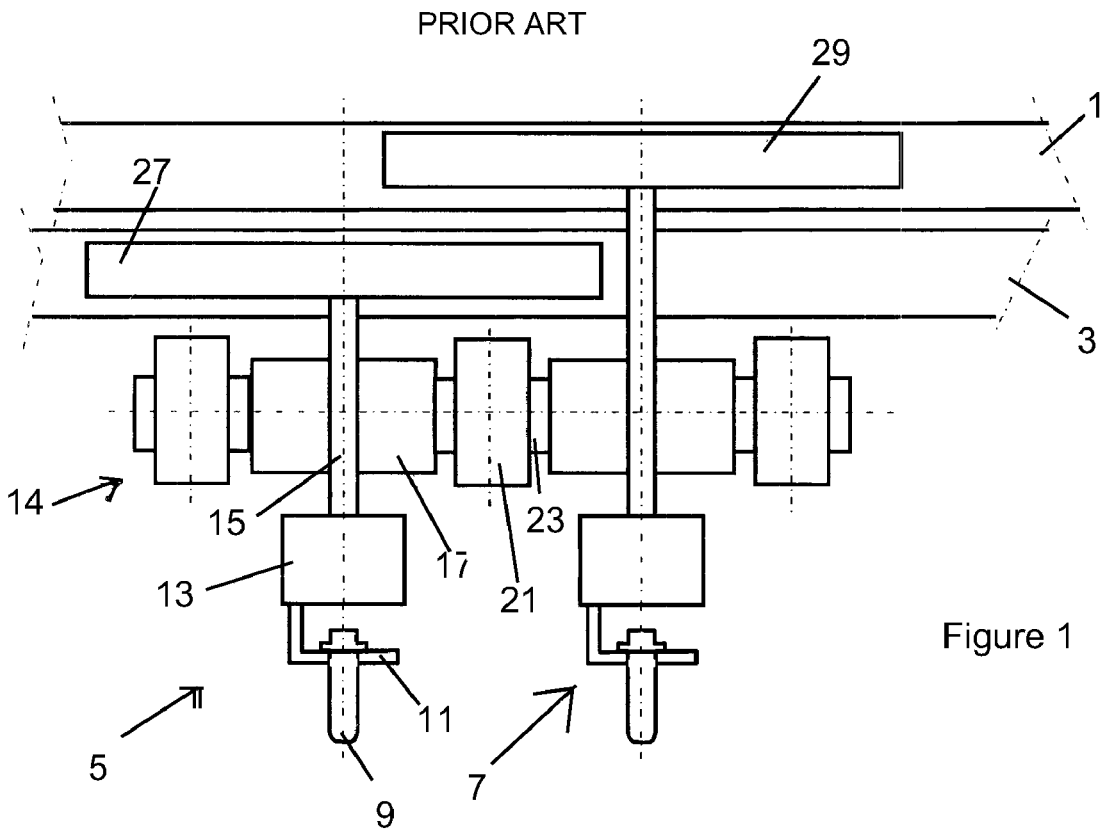
FIG. 1 is a partial front view of a transfer chain according to the prior art.
Figure 2:
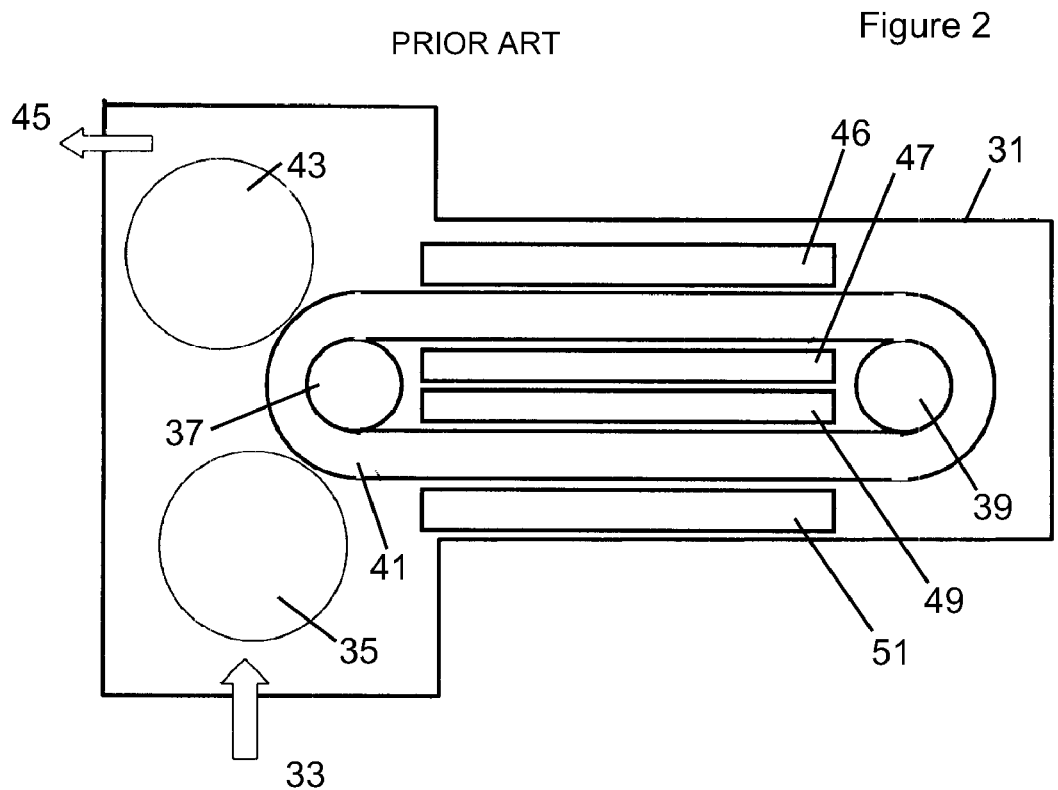
FIG. 2 is a schematic view of a heater incorporating a transfer chain according to FIG. 1.

A review of the prior art FIGS. 1-2 is made first.

FIG. 1 shows a front view of a portion of a transfer chain according to the prior art. This shows two successive preform support means 5, 7 respectively. A preform 9 has been indicated on a gripper 11 mobilized and supported by the body 13 of the support means 5.

The top of the preform 9 has a neck portion which, for example, for a container provided with a screw-top closure, includes a thread and a guard ring. The preform 9 has, in its lower portion, a bottom part which closes off the tube of cylindrical general shape, aligned with respect to the central axis shown in the figure.

Each preform support means is associated with a body 15 articulated to the articulated chain 14 so that the transverse relative position of each preform support means remains substantially constant and so that, when the articulated chain 14 moves parallel to its own length, the preform support means 5, 7, etc. is driven along the travel path in the heater shown.

Shown partially are two link chains 1 and 3, each of which meshing with a toothed wheel, namely a toothed wheel 27 in the case of the support means 5 and a toothed wheel 29 in the case of the support means 7. The vertical offset between the two link chains 1 and 3 makes it possible to cover substantially the space occupied by each of the support means and therefore to shorten the spacing between two successive preforms during travel in the heater.

The toothed wheel 27 is fastened to one end of a shaft 15, which wheel is supported so as to rotate freely on the body 17 of the articulated chain 14 and the other end of which allows the support means 13 with its gripper 11 to rotate in such a way that the preform 9 can rotate about its axis of symmetry.

In particular, the articulated chain 14 also includes intermediate bodies, such as the body 21. These intermediate bodies are mounted on rotating shafts of horizontal axis in FIG. 1 in such a way that, on particular points, during the travel on the transfer chain, the interposition of cams (not shown) allow the preform support means to rotate about the horizontal axis shown along the articulated chain 14.

FIG. 2 shows a top view of a heater with the transfer chain, again as known in the prior art. The preforms at room temperature are introduced by a loader 33 onto a first loading wheel 35 so that, when a gripper 11 of the support means 13 associated with the transfer chain 41 passes in front of a preform delivered by the wheel 35, the preform is loaded onto the support means, particularly onto a gripper such as the gripper 11, and the preform comes onto the travel path inside the heater 31. The heater has heating elements, 46, 47, 49, 51 respectively, which are associated on either side of an "outgoing" path and a "return" path on the transfer chain which rotates about wheels 37 and 39. When the preforms have traveled in the chambers bounded by the aforementioned heating elements, each heated preform is seized by a gripping member (not shown) on a wheel 43 and transferred (arrow 45) to a set of blow-molding molds, again as known in the prior art.

It is during the "outgoing" path and then during the "return" path that the preforms have to be rotated so that the heat fluxes, which are directed approximately vertically in the drawing in FIG. 2, pass right through the material of each preform to be heated. The link chains 1 and 3 shown in FIG. 1 are therefore presented by means of tensioning wheels (not shown) on the path of each of the pairs of wheels of the successive preform support means, such as the wheel 27 intended for the lower link chain 3 and the wheel 29 intended for the upper link chain 1.

It follows in particular that the height of the two link chains 1 and 3 must be correctly adjusted relative to the set of upper and lower wheels of the preform support means. This constraint means that there is a lengthy adjustment time between two container blow-molding campaigns.

It also follows from the arrangement of the two chains that the upper portion of the heater, such as the device 31 in FIG. 2, must be raised so as to allow the two chains to be positioned one on top of the other.

It should also be noted that the diameter of the toothed wheels 27 and 29 must be matched to large-pitch toothing so that each tooth can fit into the links of a chain as the toothed wheels run along the path of the preform support means in the heater 31. It follows that the movable parts of the transfer chain represent a higher mass of material because of the large size of the toothed wheels.

Figure 3:
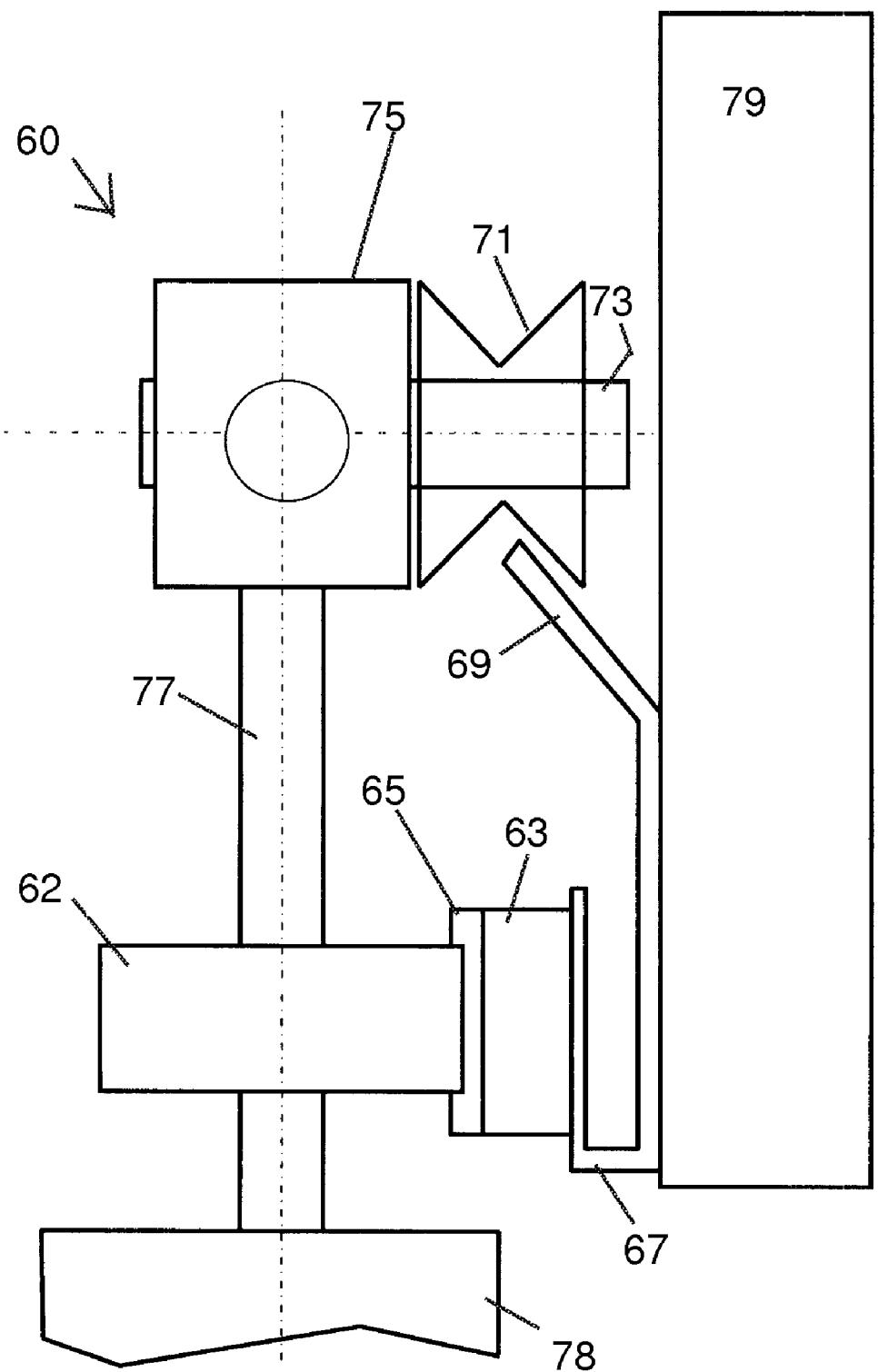
FIG. 3 is a diagram showing the principle of a transfer chain according to the present invention.

FIG. 3 shows one particular embodiment of a transfer chain suitable for a heater 91 according to the invention. This figure shows only partially said transfer chain so as to be limited to just the novel elements provided by the invention.

Attached to a support 79, in the form of an approximately vertical panel, is a support plate 67, 69.

In one particular embodiment, the support plate makes it possible to support the load of a means 71, 73 for the translational movement of the successive preform support means, such as the preform support means 60. In particular, the upper portion of the support plate serves as a rail along which a wheel 71 rolls. The wheel 71 has a self-centering profile visible in the drawing and is mounted on a shaft 73 fastened to a element 75 which has already been described in the case of an articulated chain, such as the chain 14, in the prior art shown in FIG. 1.

The element 75 then carries, so as to rotate freely thanks to a bearing (not shown), a shaft 77, the axis of which is coincident with the axis of symmetry of a preform gripped by a gripper, similar to the gripper 11 of the support means 13 of FIG. 1. In FIG. 3, the preform support means has been shown with only the top of the actual body 78, which is fastened to the end of the shaft 77. Fixedly mounted on the shaft 77, so as to rotate with it, is a pinion 62 which is intended to be driven along a rolling track 65, 63 mounted on the support 79.

In one particular embodiment, the rolling track presented to the pinion 62 is formed along the travel path of the preforms in the heater 31 (see FIG. 2), on a part 67 of the support plate 67, 69 fastened to the support 79.

In one particular embodiment, the rolling track is made up of a cogged belt which has been unwound and attached to a flat portion of the lower part 67 of the support plate 67, 69 in the form of rails.

In one particular embodiment, the cog pitch of the cogged belt 63, 65 is matched to the toothing modulus of the pinion 62, and the cog pitch and toothing modulus values are determined on the basis of intended run speed on the transfer chain so as to allow a suitable rotation speed of each of the preforms mounted on the successive support means, such as the support means 78. This rotation speed is calculated so as to allow the mass of the preform to be uniformly heated.

From the fact that it is possible on a cogged belt to produce a smaller cog pitch than the size of a link of a chain such as the link chains 1, 3 of the prior art shown in FIG. 1, it is possible to use rotating pinions 62 of the preform support means having a smaller diameter than that of the similar pinions 27 or 29 (FIG. 1) in the prior art. Moreover, in one particular embodiment, the stiffness of the rolling track 63, 65 is provided by bonding the cogged belt to the corresponding part 67 of the support plate 67, 69. It follows that it is no longer necessary to tension the rolling track that was offered by the link chains 1, 3 of the prior art. In a preferred embodiment, the cogged belt, which itself is formed from approximately straight sections or segments, is attached by screwing each of the straight sections via its free ends to the support plate.

Moreover, owing to the fact that the diameter of the pinions rotating on the shaft 77 can be reduced, it is possible to insert the pinion 62 between the element 75 of the articulated chain and the actual body of the preform support means 78. Consequently, the heater 31 (FIG. 2) on which the transfer chain of the invention is mounted has a smaller height than the heaters of the prior art shown in FIGS. 1 and 2.

In addition, because it is possible to provide a height, shown in the direction of the drawing in FIG. 3, which is sufficient for the cogged belt 65, 63, the relative adjustment of the preform support means 78 in relation to the other fixed elements, such as the articulated chain element 75, is much simpler and allows a much larger dimensional tolerance.

Finally, the association of the rolling track 69 and of the portion 67 for attaching the rolling track 63, 65 to one and the same support plate 67, 69 is determined so as to dispense with adjusting the relative heights of the support cams of the articulated chain 14 relative to the link chains 1 and 3 on the one hand and relative to the heating chambers of the heater 31 (FIG. 2) on the other.

Figure 4:
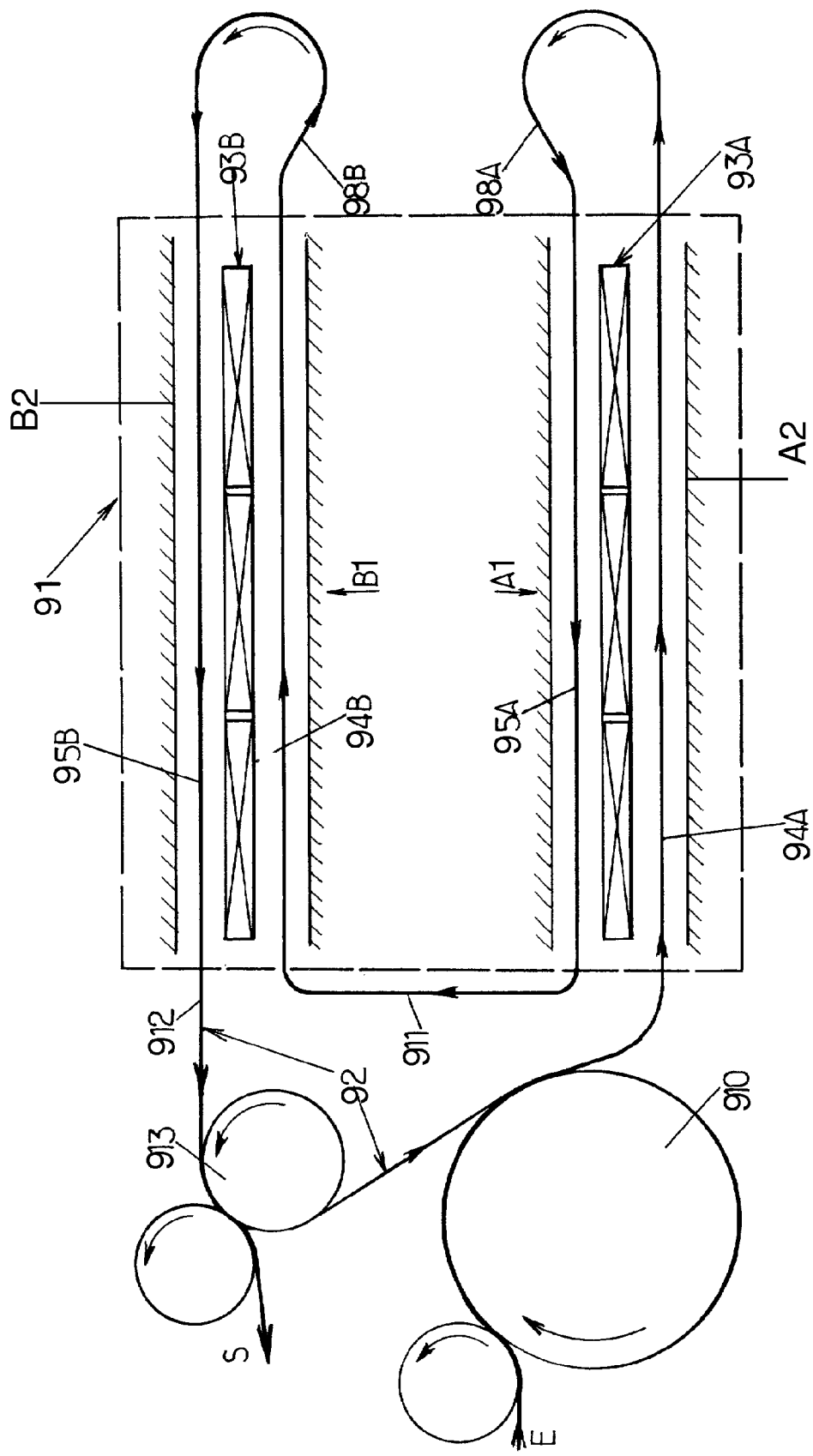
FIG. 4 is a diagram showing the principle of another embodiment of a transfer chain and of a heater according to the present invention.

FIG. 4 illustrates schematically another embodiment of a transfer chain and a heater 91 incorporating the invention. In practice, the arrangement illustrated in FIG. 4 consists in duplicating (parts A1 and B1) the arrangement shown in FIG. 2, the preforms or blanks therefore making four successive passes through the heater 91—and therefore undergoing four successive heating steps—interrupted by thermal stabilization periods. The preforms arriving at E are delivered by loading means 910 (such as an "investing" wheel) to the transport means 92 in the form of a closed-loop chain 92 of support devices. The chain 92 then penetrates the part A1 A2 in the diagram of the oven 91 via its branch 94A where the preforms undergo a first heating step and then, after passing along the looped segment 98A, a second heating step on the branch 95A.

The preforms then pass along a joining segment 911, which also defines a thermal stabilization zone, bringing them to the second part B1 of the oven in which they follow a similar path: branch 94B with heating, looped segment 98B with thermal stabilization, branch 95B with heating.

At the exit of the branch 95B, a segment 912 brings the preforms to unloading means 913 (such as a "devesting" wheel) where they are detached from the support devices of the chain 92 (which returns to the loading means 910) and are removed at S, for example sent to a blow molding or stretch-blow molding unit.

Because the discharging means 913 are not immediately adjacent to the exit of the oven, the segment 912 itself constitutes a thermal stabilization zone for completing the diffusion of heat within the thermoplastic material.

The four branches 94A, 95A, 94B, 95B may be mutually parallel so that it is possible to construct a device of simple and compact arrangement, with less heat loss. Furthermore, it is possible to place, in the central portion between the above-mentioned parts A and B of the heater 91, members common to the operation of these two parts A1 and B1, and especially the positioning of the support plate intended to receive here four straight cogged-belt sections along the reflectors of the heating elements, namely from the bottom up:
- the cogged belt section associated with the reflector element A2 for rotating the preforms in the heating section 94A;
- the cogged belt section associated with the reflector element A1 for rotating the preforms in the heating section 95A;
- the cogged belt section associated with the reflector element B1 for rotating the preforms in the heating section 94B; and
- the cogged belt section associated with the reflector element B2 for rotating the preforms in the heating section 95B.

The invention claimed is:

1. A transfer chain for a preform heater, comprising:
a support (79);
a rolling track (63, 65) fastened to the support;
an articulated chain (14) with an element (75), the articulated chain configured to be driven by a motor means;
a heater (31, 91);
a preform configured to travel in the heater;
successive preform support means (60) mounted on the articulated chain;
a means for rotating the preform as the preform travels in the heater (31, 91),
said means for rotating the preform comprising a shaft (77) fastened to the element (75) and carrying a pinion (62) compelled to roll along the rolling track (63, 65) when said articulated chain is driven by the motor means;
a translation means (71, 73) for translational movement of the preform support means (60); and
a support plate (67, 69) accommodated to the support (79), the support plate being a rail-shaped, approximately vertical panel comprised of i) an upper portion (69) making a rail intended to support a load of the translation means (71, 73), and ii) a lower part (67) fastened to the rolling track (63, 65) for the pinion (62).

2. The transfer chain as claimed in claim 1, characterized in that the upper portion (69) of the support plate is arranged as a rolling rail for a wheel (71), which wheel has a self-centering profile and is mounted on a further shaft (73) fastened to the element (75).

3. The transfer chain as claimed in claim 2, characterized in that the element (75) carries the shaft (77), the axis of the shaft (77) being coincident with the axis of symmetry of a preform gripped by a gripper, the shaft (77) carrying, fixed so as to rotate, the pinion (62) which pinion (62) is arranged to be driven along the rolling track (65, 63) mounted on the lower part (67) of the support (79).

4. The transfer chain as claimed in claim 3, characterized in that the rolling track (63, 65), presented to the pinion (62), is formed along a travel path that the preforms take in the heater (31, 91), on said lower portion (67) of the support plate (67, 69) fastened to the support (79) and that the rolling track (63, 65) is made up of a cogged belt unwound and attach to a flat portion of the lower part (67) of the support plate (67, 69).

5. The transfer chain as claimed in claim 4, characterized in that the cog pitch of the cogged belt (63, 65) is adapted to the toothing modulus of the pinion (62), and the cog pitch and toothing modulus values are determined on the basis of the intended run speed on the transfer chain so as to give each of the preforms mounted on successive support means (60) a suitable rotation speed, the rotation speed being calculated so as to allow the mass of the preform to be uniformly heated.

6. The transfer chain as claimed in claim 5, characterized in that the stiffness of the rolling track (63, 65) is provided by screwing the ends of approximately straight sections of the cogged belt onto the corresponding portion (67) of the support plate (67, 69).

7. The transfer chain as claimed in claim 1, characterized in that the pinion (62) is interposed between the element (75) of the articulated chain and an actual body of the preform support means (60).

8. The transfer chain as claimed in claim 7, characterized in that the cogged belt (65, 63) has a height that simplifies the relative adjustment of the preform support means (60) with respect to other, stationary elements, including the articulated chain (75).

9. The transfer chain as claimed in claim 1, wherein said heater is comprised of plural heating elements and there are plural paths passing through the heating elements so that each pinion of the means for rotating the preform is in turn engaged on a rolling track and a frame associated with said heating elements (A1, A2, B1, B2).

10. A machine for blow-molding containers based on preforms heated in a heater, comprising the preform transfer chain as claimed in claim 1.

11. A transfer chain for a preform heater, comprising:
successive preform support means (60) articulated from an articulated chain, each preform support means comprised of a body element (75) and a translational movement part (71, 73), the translational movement part comprised of a wheel (71) mounted on a first shaft (73) fastened to the body element (75);
a support (79);
a support plate (67, 69) attached to the support (79), the support plate being an approximately vertical panel, an upper portion of the support plate (69) supporting the wheel (73) and a load of the translational movement part (71, 73);
a rolling track (63, 65) mounted on a lower portion (67) of said support plate, the rolling track (63, 65) formed along a travel path of preforms within a preform heater (91);
each preform support means further comprising i) a second shaft (77) carried by the body element (75), an axis of the second shaft (77) being coincident with an axis of a preform gripped by a gripper, ii) a pinion (62) fixedly mounted on the second shaft (77) and rotating with the second shaft (77), the pinion (62) configured to be driven along the rolling track (63, 65), and iii) an actual body (78) attached to an end of the second shaft after the pinion (62).

12. The transfer chain of claim 11, wherein,
the rolling track is comprised of a cogged belt (63, 65) matched to a toothing modulus of the pinion (62).

13. The transfer chain of claim 11, wherein,
the upper portion (69) of the support plate extends away from the support (79), and
a cross-section of the lower portion (67) of the support plate defines a U-shape.

14. The transfer chain of claim 1, wherein,
the upper portion (69) of the support plate extends away from the support (79), and
a cross-section of the lower portion (67) of the support plate defines a U-shape.

15. A transfer chain for a preform heater, comprising:
a articulated chain;
a rolling track (63, 65);
successive preform support means (60),
each perform comprised of i) an element (75) mounted on the articulated chain, and ii) a means for rotating an attached preform as the preform travels in a heater (31, 91), the means for rotating comprising a translational movement part (71, 73) mounted on the element (75),
the translational movement part comprised of i) a first shaft (73) fastened to the element (75) and a wheel (71) mounted on the first shaft (73), ii) a second shaft (77) fastened to the element (75), iii) a pinion (62) fixedly carried on the first shaft (77) and rotating with the second shaft (77), and iv) an actual body (78) attached to an end of the second shaft after the pinion (62), an axis of the first shaft (73) intersecting at approximately a right angle with an axis of the second shaft (77), the pinion (62) arranged to be driven along the rolling track (63, 65);
a support (79); and
a rail-shaped support plate (67, 69) attached to the support (79), the support plate an approximately vertical panel and comprised of i) an upper portion (69) defining a rail supporting the wheel (71) of each perform support means (60), and ii) a lower part (67) fastened to the rolling track (63, 65).

16. The transfer chain of claim 15, wherein,
the upper portion (69) of the support plate extends away from the support (79), and
a cross-section of the lower portion (67) of the support plate defines a U-shape.

* * * * *